(12) United States Patent
Kim et al.

(10) Patent No.: US 12,034,467 B2
(45) Date of Patent: Jul. 9, 2024

(54) COMMUNICATION CIRCUITRY PERFORMING COMMUNICATION USING A PLURALITY OF FREQUENCY BANDS AND ELECTRONIC DEVICE COMPRISING THE COMMUNICATION CIRCUITRY

(71) Applicant: Samsung Electronics Co., Ltd., Gyeonggi-do (KR)

(72) Inventors: Jungjoon Kim, Gyeonggi-do (KR); Yongjun An, Gyeonggi-do (KR); Hyunseok Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 293 days.

(21) Appl. No.: 17/530,958

(22) Filed: Nov. 19, 2021

(65) Prior Publication Data

US 2022/0131567 A1    Apr. 28, 2022

Related U.S. Application Data

(63) Continuation of application No. PCT/KR2021/014732, filed on Oct. 20, 2021.

(30) Foreign Application Priority Data

Oct. 23, 2020   (KR) .................. 10-2020-0138301
Dec. 18, 2020   (KR) .................. 10-2020-0178105

(51) Int. Cl.
*H04B 1/40*      (2015.01)
*H04B 1/00*      (2006.01)

(52) U.S. Cl.
CPC ............. *H04B 1/40* (2013.01); *H04B 1/0057* (2013.01); *H04B 1/006* (2013.01)

(58) Field of Classification Search
CPC . H04B 1/40; H04B 1/401; H04B 1/44; H04B 1/54; H04B 1/005; H04B 1/0053; H04B 1/0057; H04B 1/006; H04B 1/0064
See application file for complete search history.

(56) References Cited

U.S. PATENT DOCUMENTS 8,463,199  B2 *   6/2013   Sugar ..................... H04B 1/005
                                                                    455/272
9,270,302  B2 *   2/2016   Khlat ................... H04B 1/0064
                              (Continued)

FOREIGN PATENT DOCUMENTS

KR      1020160039437       4/2016
KR      1020160145449      12/2016

OTHER PUBLICATIONS

International Search Report dated Jan. 19, 2022 issued in counterpart application No. PCT/KR2021/014732, 12 pages.

*Primary Examiner* — Quochien B Vuong
(74) *Attorney, Agent, or Firm* — The Farrell Law Firm, P.C.

(57) ABSTRACT

Communication circuitry and an electronic device including the communication circuitry are disclosed. The communication circuitry may include a first RF chain configured to output a first transmission signal in a first frequency band through a first antenna or receive a first reception signal in the first frequency band through the first antenna; a second RF chain configured to output a second transmission signal in a second frequency band through a second antenna or receive a second reception signal in the second frequency band through the second antenna; a first reception chain configured to receive a first signal in the first frequency band, which is received through the second antenna; a second reception chain configured to receive a second signal in the second frequency band, which is received through the first antenna; and a switch configured to connect the first RF chain and the second reception chain to the first antenna and connect the second RF chain and the first reception chain to the second antenna.

16 Claims, 9 Drawing Sheets

(56) References Cited

U.S. PATENT DOCUMENTS

| | | |
|---|---|---|
| 9,843,375 B2 | 12/2017 | Kim et al. |
| 10,224,611 B2 * | 3/2019 | Hong .................... H04B 1/0064 |
| 11,362,689 B2 * | 6/2022 | Go .......................... H04B 1/04 |
| 2014/0003300 A1 | 1/2014 | Weissman et al. |
| 2014/0328220 A1 | 11/2014 | Khlat et al. |
| 2014/0342678 A1 | 11/2014 | Khiat |
| 2016/0099800 A1 | 4/2016 | Park |
| 2016/0365889 A1 | 12/2016 | Weissman et al. |
| 2018/0191067 A1 | 7/2018 | Khlat |
| 2019/0246402 A1 | 8/2019 | Negus et al. |
| 2019/0379409 A1 | 12/2019 | Thompson et al. |

\* cited by examiner

COMMUNICATION CIRCUITRY PERFORMING COMMUNICATION USING A PLURALITY OF FREQUENCY BANDS AND ELECTRONIC DEVICE COMPRISING THE COMMUNICATION CIRCUITRY

CROSS-REFERENCE TO RELATED APPLICATIONS

This application is a Bypass Continuation Application of International Application No. PCT/KR2021/014732, which was filed on Oct. 20, 2021, and is based on and claims priority under 35 U.S.C. § 119 to Korean Patent Application No. 10-2020-0138301, which was filed in the Korean Intellectual Property Office on Oct. 23, 2020, and Korean Patent Application No. 10-2020-0178105, which was filed in the Korean Intellectual Property Office on Dec. 18, 2020, the entire disclosure of each of which is incorporated herein by reference.

BACKGROUND

1. Field

The disclosure relates generally to communication circuitry and an electronic device for performing communication using a plurality of frequency bands.

2. Description of Related Art

A variety of electronic devices such as a smartphone, a tablet personal computer (PC), a portable multimedia player (PMP), a personal digital assistant (PDA), a laptop PC, or a wearable device are proliferating.

Electronic devices may support a communication scheme (e.g., dual connectivity or carrier aggregation) using a plurality of frequency bands, which may have a wider frequency band than a communication scheme using a single frequency band. A communication scheme using a plurality of frequency bands and having relatively wide frequency bands may realize a higher transmission or reception rate of data than other communication schemes.

In order to support a communication scheme using a plurality of frequency bands, an electronic device may include a plurality of front end modules (FEMs) for processing signals in respective frequency bands between an antenna and a transceiver.

As the number of frequency bands supported by an electronic device increases, the number of FEMs required may also increase. As the number of FEMs increases, the available space in the electronic device in which other components can be mounted is reduced, making it difficult to accommodate other components.

When one FEM supports a plurality of frequency bands, it may be difficult to simultaneously output transmission signals in a plurality of frequency bands through a single antenna connected to the FEM. When transmission signals in a plurality of frequency bands are simultaneously output through a single antenna, the linearity of the output signal may be lowered.

SUMMARY

A communication circuitry and an electronic device including the communication circuitry according to an embodiment of the disclosure are able to simultaneously output or receive signals in different frequency bands using an FEM designed to simultaneously output signals in different frequency bands.

Communication circuitry according to an embodiment of the disclosure may include a first RF chain configured to output a transmission signal in a first frequency band through a first antenna or receive a reception signal in the first frequency band through the first antenna; a second RF chain configured to output a transmission signal in a second frequency band through a second antenna or receive a reception signal in the second frequency band through the second antenna; a first reception chain configured to receive a signal in the first frequency band, which is received through the second antenna; a second reception chain configured to receive a signal in the second frequency band, which is received through the first antenna; and a switch, wherein the switch may be configured to connect the first RF chain and the second reception chain to the first antenna and connect the second RF chain and the first reception chain to the second antenna.

Communication circuitry according to an embodiment of the disclosure may include a first FEM including a first switch connected to a first antenna; and a second FEM including a second switch connected to a second antenna, wherein the first FEM may include: a first RF chain configured to output a transmission signal in a first frequency band through the first antenna or receive a reception signal in the first frequency band through the first antenna; and a second RF chain configured to output a transmission signal in a second frequency band through the second antenna or receive a reception signal in the second frequency band through the second antenna, wherein the second FEM may include: a first reception chain configured to receive a signal in the first frequency band, which is received through the second antenna; and a second reception chain configured to receive a signal in the second frequency band, which is received through the first antenna, wherein the first switch may be configured to connect the second RF chain and the second FEM, and wherein the second switch may be configured to connect the second reception chain and the first FEM.

An electronic device according to an embodiment of the disclosure may include a communication processor (CP); and communication circuitry connected to the CP, wherein the communication circuitry may include: a first RF chain configured to output a transmission signal in a first frequency band through a first antenna or receive a reception signal in the first frequency band through the first antenna; a second RF chain configured to output a transmission signal in a second frequency band through a second antenna or receive a reception signal in the second frequency band through the second antenna; a first reception chain configured to receive a signal in the first frequency band, which is received through the second antenna; a second reception chain configured to receive a signal in the second frequency band, which is received through the first antenna; and a switch, and wherein the communication processor may be configured to control the switch to connect the first RF chain and the second reception chain to the first antenna and control the switch to connect the second RF chain and the first reception chain to the second antenna.

A communication circuitry and an electronic device including the communication circuitry according to an embodiment of the disclosure are able to simultaneously output or receive signals in different frequency bands using an FEM designed to simultaneously output signals in different frequency bands. Accordingly, it is possible to reduce the space required for mounting the FEMs, facilitating design related to the arrangement of other components.

BRIEF DESCRIPTION OF DRAWINGS

The above and other aspects, features, and advantages of certain embodiments of the disclosure will be apparent from the following detailed description taken in conjunction with the accompanying drawings, in which.

DETAILED DESCRIPTION

Figure 1:
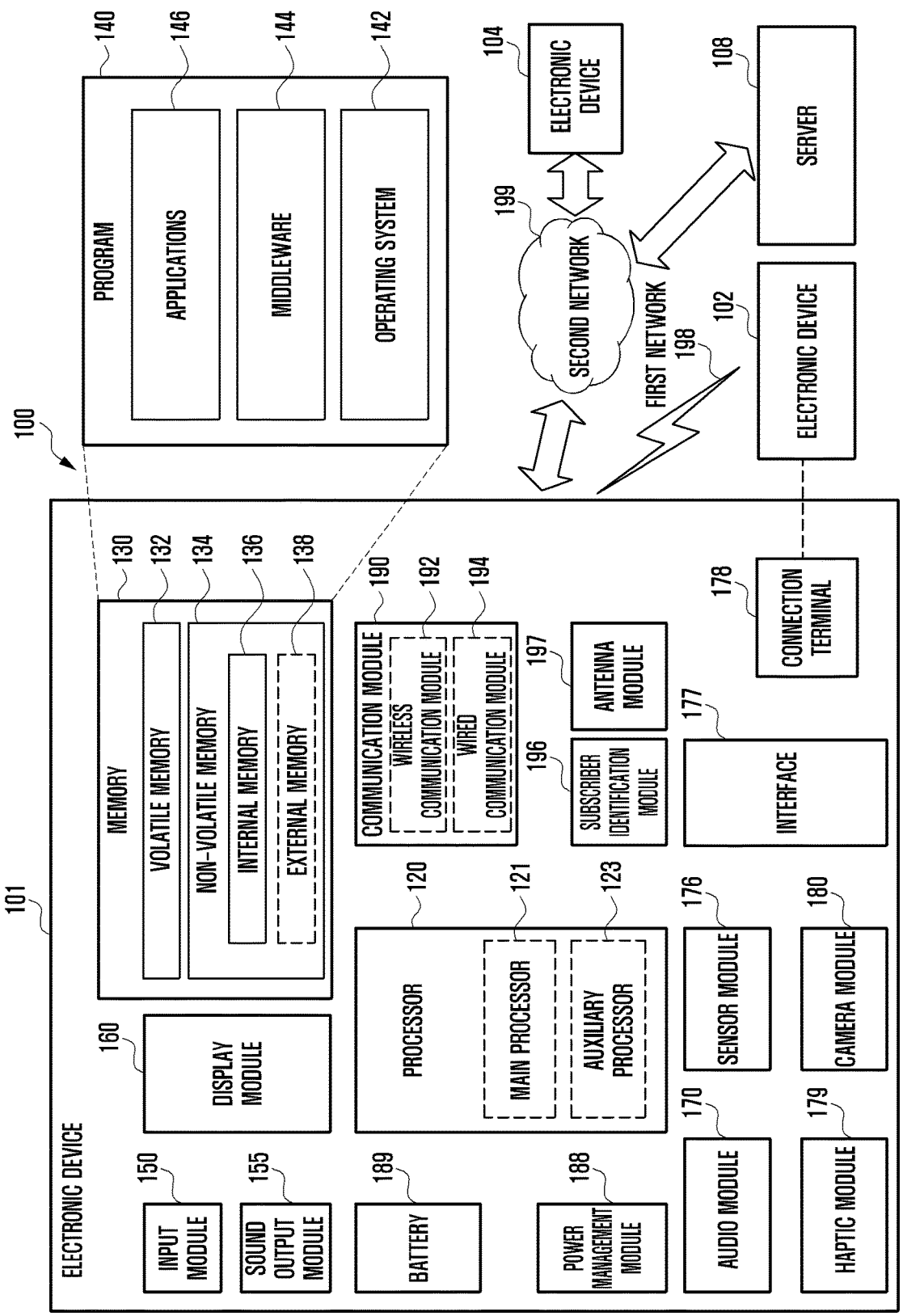
FIG. 1 illustrates an electronic device according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the 11 connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a CP) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent DNN (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
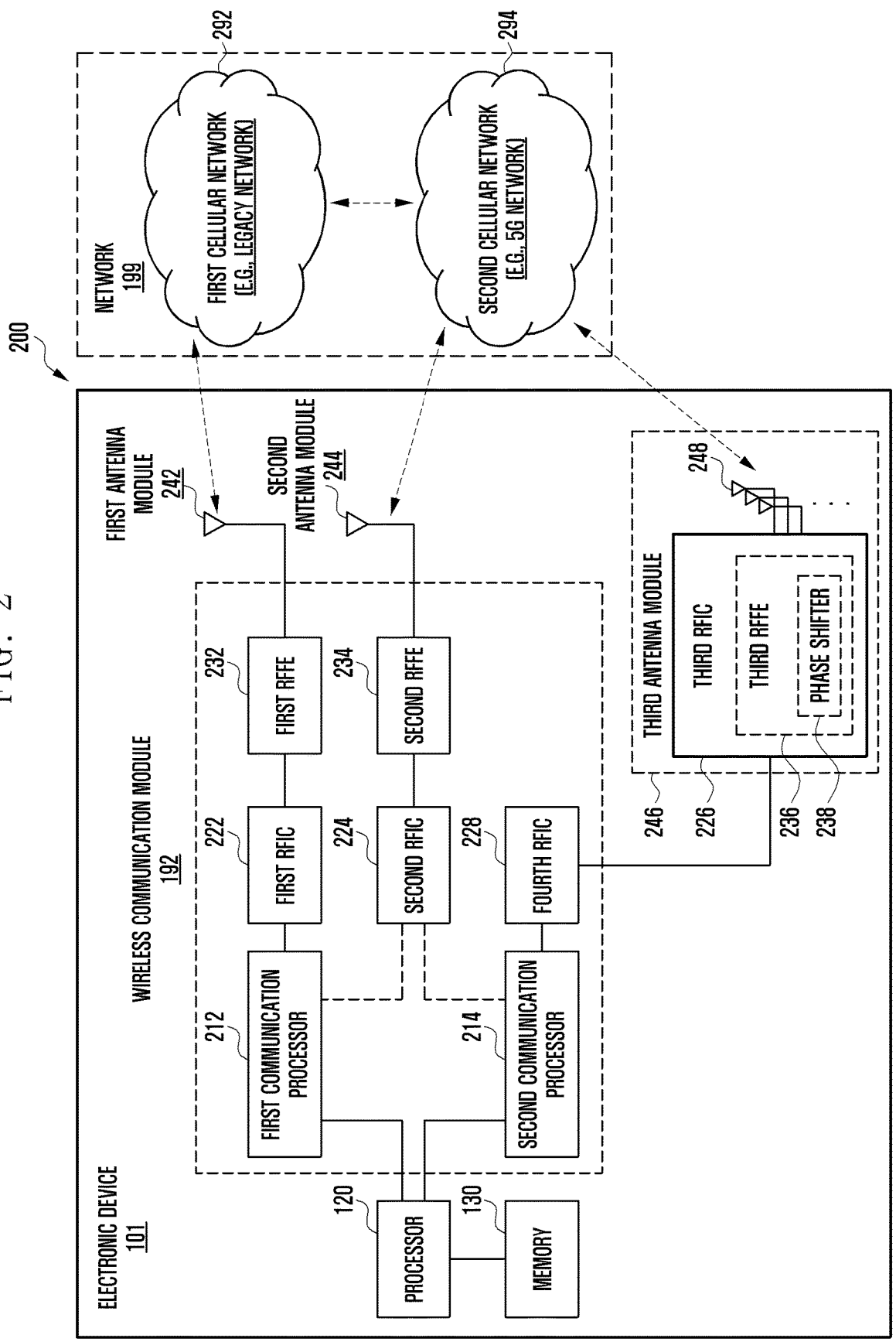
FIG. 2 illustrates an electronic device for supporting legacy network communication and 5$^{th}$ generation (5G) network communication according to an embodiment.

FIG. 2 illustrates an electronic device in a network environment including a plurality of cellular networks according to an embodiment.

Referring to FIG. 2, the electronic device 101 may include a first CP 212, second CP 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first CP 212, second CP 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first CP 212 may establish a communication channel of a band to be used for wireless communication with the first cellular network 292 and support legacy network communication through the established communication channel. According to various embodiments, the first cellular network may be a legacy network including a 2nd generation (2G), 3rd generation (3G), 4G, or long term evolution (LTE) network. The second CP 214 may establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in 3rd generation partnership project (3GPP). Additionally, according to an embodiment, the first CP 212 or the second CP 214 may establish a communication channel corresponding to another designated band (e.g., about 6 GHz or less) of bands to be used for wireless communication with the second cellular network 294 and support 5G network communication through the established communication channel. According to one embodiment, the first CP 212 and the second CP 214 may be implemented in a single chip or a single package. According to various embodiments, the first CP 212 or the second CP 214 may be formed in a single chip or a single package with the processor 120, the auxiliary processor 123, or the communication module 190.

Upon transmission, the first RFIC 222 may convert a baseband signal generated by the first CP 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first CP 212.

Upon transmission, the second RFIC 224 may convert a baseband signal generated by the first CP 212 or the second CP 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding CP of the first CP 212 or the second CP 214.

The third RFIC 226 may convert a baseband signal generated by the second CP 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second CP 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second CP 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second CP 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., a main PCB). In this case, the third RFIC 226 is disposed in a partial area (e.g., a lower surface) of the first substrate and a separate second substrate (e.g., a sub PCB), and the antenna 248 is disposed in another partial area (e.g., an upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-SA (NSA)) in connection with the first cellular network 292. For example, the 5G network may have only an access network (e.g., 5G radio access network (RAN) or a next generation (NG) RAN and have no core network (e.g., NG core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., NR protocol information) for communication with a 5G network may be stored in the memory 130 to be accessed by other components (e.g., the processor 120, the first CP 212, or the second CP 214).

Figure 3A:
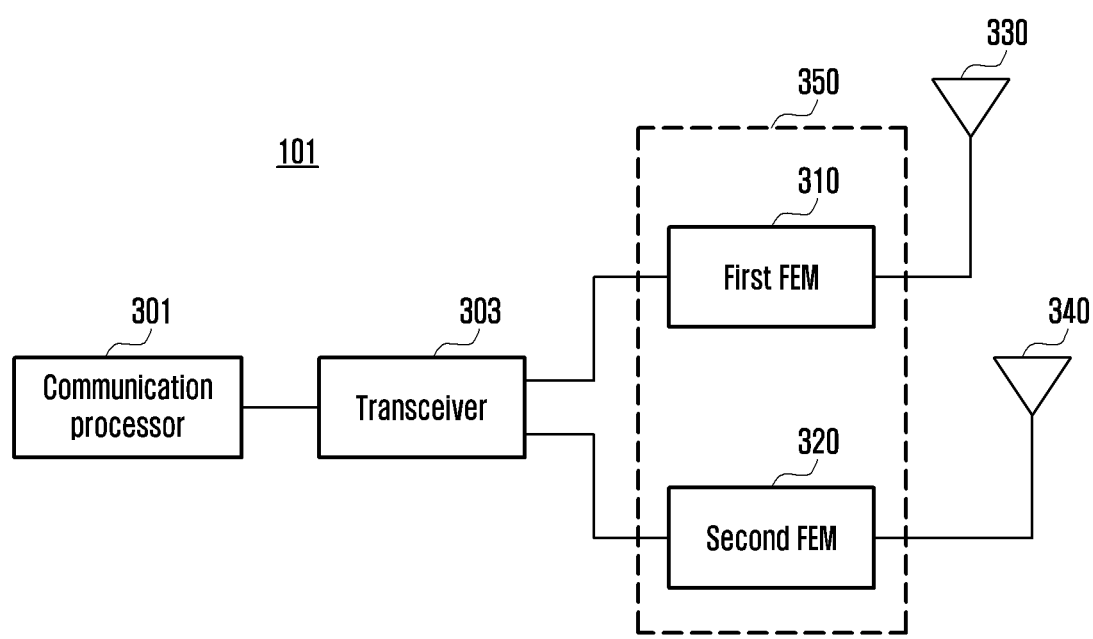
FIG. 3A illustrates an electronic device according to an embodiment.

FIG. 3A illustrates an electronic device according to an embodiment.

Referring to FIG. 3A, an electronic device includes a CP 301, a transceiver 303, communication circuitry 350 including a first FEM 310 and a second FEM 320, a first antenna 330, and a second antenna 340.

The CP 301 may receive or transmit control data or user data through short-range wireless communication (e.g., Wi-Fi or Bluetooth) or cellular wireless communication (e.g., 4G mobile communication or 5G mobile communication). The CP 301 may establish a cellular communication connection with a base station through control data, and transmit data received from an AP to the base station or transmit data received from the base station to the processor 120 through the established cellular communication.

The transceiver 303 may perform various operations of processing signals received from the CP 310. The transceiver 303 may perform a modulation operation on a signal received from the CP 301. The transceiver 303 may perform a frequency modulation operation for converting a baseband signal into an RF signal used for cellular communication. The transceiver 303 may perform a demodulation operation on a signal received from the outside through the communication circuitry 350. The transceiver 303 may perform a frequency demodulation operation for converting an RF signal into a baseband signal.

The communication circuitry 350 may include at least two or more RF chains that receive signals radiated from the outside through the first antenna 330 and/or the second antenna 340, or radiate signals transmitted by the transceiver 303 through the first antenna 330 and/or the second antenna 340. For example, the RF chain may indicate a movement path of a signal. The RF chain may include various components (e.g., amplifiers, switches, or filters) that amplify the signal received through the first antenna 330 and/or the second antenna 340, and/or the signal transmitted by the transceiver 303, and filter the amplified signal.

The communication circuitry 350 may include at least two or more RF chains to support a communication scheme using at least two or more frequency bands. For example, the communication circuitry 350 may support dual connectivity that is a data communication scheme through different cellular communication schemes (e.g., 4G cellular communication and 5G cellular communication) or carrier aggregation that is a data communication scheme using a plurality of frequency bands. To this end, the communication circuitry 350 may include a first FEM 310 that outputs a signal in the first frequency band through the first antenna 330 or receives a signal in the first frequency band through the first antenna 330, and/or a second FEM 320 that outputs a signal in the second frequency band through the second antenna 340 or receives a signal in the second frequency band through the second antenna 340.

Although FIG. 3A illustrates that the communication circuitry 350 includes two FEMs, the communication circuitry 350 may include more FEMs depending on simultaneous transmission or reception of signals through different frequency bands supported by the communication circuitry 350. For example, the communication circuitry 330 may include three FEMs to support frequency division duplexing (FDD) using all signals in three frequency bands (e.g., band B1 (1920 to 1980 MHz), band B2 (1850 to 1910 MHz), and band B3 (1710 to 1785 MHz)).

Figure 3B:
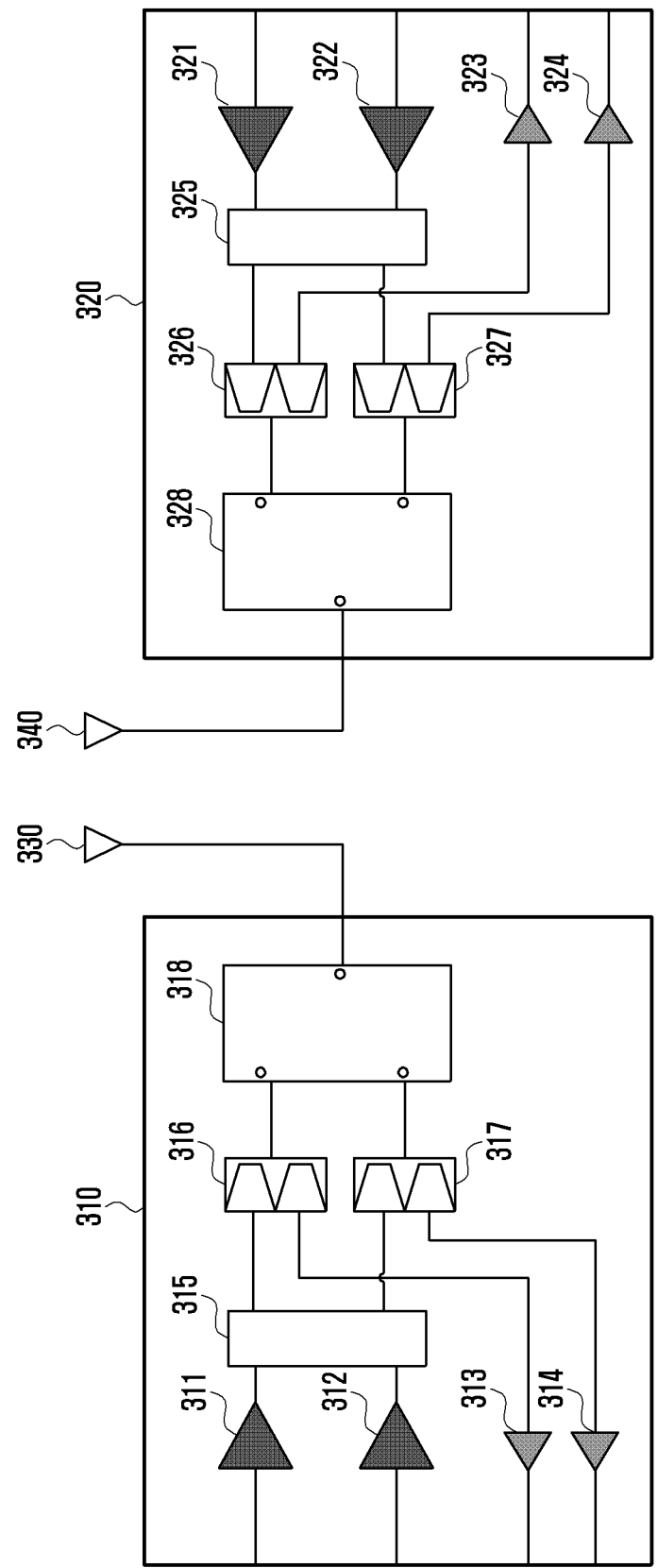
FIG. 3B illustrates communication circuitry according to an embodiment.

FIG. 3B illustrates communication circuitry according to an embodiment.

Referring to FIG. 3B, the first FEM 310 includes a first amplifier 311 for amplifying a transmission signal in a first frequency band, a second amplifier 312 for amplifying a transmission signal in a second frequency band, a first low-noise amplifier (LNA) 313 for amplifying a reception signal in the first frequency band, which is received through a first antenna 330, a second LNA 314 for amplifying a reception signal in the second frequency band, which is received through the first antenna 330, a band selection switch 315 for controlling the connection between the first amplifier 311 and the first duplexer 316 and the connection between the second amplifier 312 and the second duplexer 317 depending on the used frequency band, a first duplexer 316 for separating the signal in the first frequency band into a transmission signal in the first frequency band and a reception signal in the first frequency band, a second duplexer 317 for separating the signal in the second frequency band into a transmission signal in the second frequency band and a reception signal in the second frequency band, and a first switch 318 for controlling the connection between the first antenna 330 and the first duplexer 316 and the connection between the first antenna 330 and the second duplexer 317.

The second FEM 320 includes a third amplifier 321 for amplifying a transmission signal in the first frequency band, a fourth amplifier 322 for amplifying a transmission signal in the second frequency band, a third LNA 313 for amplifying a reception signal in the first frequency band, which is received through a second antenna 340, a fourth LNA 324 for amplifying a reception signal in the second frequency band, which is received through the second antenna 340, a band selection switch 325 for controlling the connection between the third amplifier 321 and the third duplexer 326 and the connection between the fourth amplifier 322 and the fourth duplexer 327 depending on the used frequency band, a third duplexer 326 for separating the signal in the first frequency band into a transmission signal in the first frequency band and a reception signal in the first frequency band, a fourth duplexer 327 for separating the signal in the second frequency band into a transmission signal in the second frequency band and a reception signal in the second frequency band, and a second switch 328 for controlling the connection between the second antenna 340 and the third duplexer 326 and the connection between the second antenna 340 and the fourth duplexer 327.

The first antenna 330 may not be able to simultaneously output transmission signals in different frequency bands in order to ensure the linearity of the signal output to the first antenna 330. For example, when the first switch 318 controls the first duplexer 316 and the first antenna 330 to be electrically connected, and controls the second duplexer 317 and the second antenna 340 to be electrically connected, the transmission signal in the first frequency band and the transmission signal in the second frequency band may be transmitted to the first antenna 330 through the first switch 318. In this case, the first switch 318 may reduce the linearity of the transmission signal in the first frequency band and the transmission signal in the second frequency band. Accordingly, the communication circuitry 350 may control the transmission signal in the first frequency band to be output through the first antenna 330 and the transmission signal in the second frequency band to be output through the second antenna 340.

The transmission signal in the first frequency band may be amplified through the first amplifier 311, and may be output to the first antenna 330 through the band selection switch 315, the first duplexer 316, or the first switch 318. The transmission signal in the second frequency band may be amplified through the fourth amplifier 322, and may be output to the second antenna 340 through the band selection switch 325, the fourth duplexer 327, and/or the second switch 328.

The reception signal in the first frequency band received through the first antenna 330 may be transmitted to a transceiver (e.g., the transceiver 303 in FIG. 3A) through the first switch 318, the first duplexer 316, and/or the first LNA 313. The reception signal in the second frequency band received through the first antenna 330 may be transmitted to the transceiver 303 through the first switch 318, the second duplexer 317, and/or the second LNA 314.

The reception signal in the first frequency band received through the second antenna 340 may be transmitted to the transceiver 303 through the second switch 328, the third duplexer 326, and/or the third LNA 323. The reception signal in the second frequency band received through the second antenna 340 may be transmitted to the transceiver 303 through the second amplifier 328, the fourth duplexer 327, and/or the fourth LNA 324.

The second amplifier 312 included in the first FEM 310 and the third amplifier 321 included in the second FEM 320 may not actually be used. In this case, the sizes of the first FEM 310 and the second FEM 320 may increase due to the space occupied by the second amplifier 312 and the third amplifier 321, and the second amplifier 312 and the third amplifier 321 may increase the manufacturing cost of the FEMs.

Figure 4:
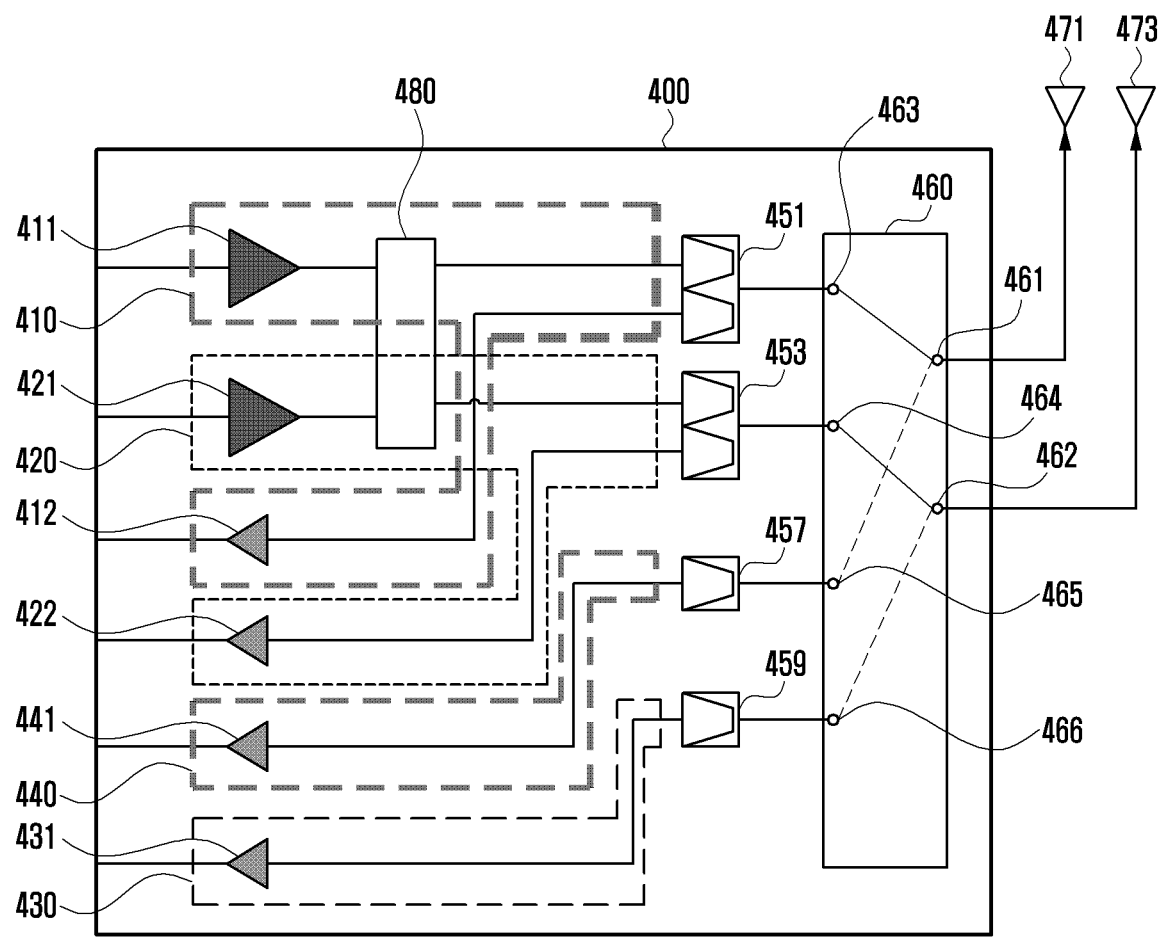
FIG. 4 illustrates communication circuitry according to an embodiment.

FIG. 4 illustrates communication circuitry according to an embodiment.

Referring to FIG. 4, an FEM 400 implemented in the communication circuitry includes a first RF chain 410 for outputting a transmission signal in a first frequency band or receiving a reception signal in a first frequency band, a second RF chain 420 for outputting a transmission signal in a second frequency band or receiving a reception signal in a second frequency band, a first reception chain 430 for receiving the reception signal in the first frequency band, and a second reception chain 440 for receiving the reception signal in the second frequency band.

The first RF chain 410 includes a first amplifier 411 and a first LNA 412 for outputting the transmission signal in the first frequency band through the first antenna 471 or receiving the reception signal in the first frequency band through the first antenna 471.

The second RF chain 420 includes a second amplifier 421 and a second LNA 422 for outputting the transmission signal in the second frequency band through the second antenna 473 or receiving the reception signal in the second frequency band through the second antenna 473.

The first reception chain 430 includes a third LNA 431 to support diversity reception of the reception signal in the first frequency band through the second antenna 473. The second reception chain 440 includes a fourth LNA 441 to support diversity reception of the reception signal in the second frequency band through the first antenna 471.

The FEM 400 includes a switch 460 that performs connection or disconnection between the components included in the FEM 400 and the first antenna 471 and/or the second antenna 473. The switch 460 includes a first terminal 461 connected to the first antenna 471, a second terminal 462 connected to the second antenna 473, a third terminal 463 connected to the first RF chain 410 through a first duplexer 451, a fourth terminal 464 connected to the second RF chain 420 through a second duplexer 453, a fifth terminal 465 connected to the second reception chain 440 through a first reception filter 457, and a sixth terminal 466 connected to the first reception chain 430 through a second reception filter 459. The number of terminals of the switch 460 may vary depending on the number of frequency bands supported by the FEM 400.

The FEM 400 includes a first duplexer 451 for separating the transmission signal in the first frequency band transmitted through the first antenna 471 and the reception signal in the first frequency band received through the first antenna 471. The first duplexer 451 may be connected between the first RF chain 410 and the third terminal 463 of the switch 460.

The FEM 400 includes a second duplexer 453 for separating the transmission signal in the second frequency band transmitted through the second antenna 473 and the reception signal in the second frequency band received through the second antenna 473. The second duplexer 453 may be connected between the second RF chain 420 and the fourth terminal 464 of the switch 460.

The FEM 400 further includes a band selection switch 480 for controlling the connection between the first amplifier 411 and the first duplexer 451 and the connection between the second amplifier 421 and the second duplexer 453 depending on the used frequency band. The band selection switch 480 may be omitted according to a designer's intention.

The FEM 400 includes a first reception filter 457 for separating the reception signal in the second frequency band from the signal received through the first antenna 471. The first reception filter 457 may be connected between the second reception chain 440 and the fifth terminal 465 of the switch 460.

The FEM 400 includes a second reception filter 459 for separating the reception signal in the first frequency band from the signal received through the second antenna 473. The second reception filter 459 may be connected between the first reception chain 430 and the sixth terminal 466 of the switch 460.

The switch 460 may be implemented as a multi-on switch in which the first terminal 461 and/or the second terminal 462 can be connected to at least two or more terminals. For example, the switch 460 may connect the first RF chain 410 and the second reception chain 440 to the first antenna 471 in such a manner that the first terminal 461 is connected to the third terminal 463 and that the first terminal 461 is connected to the fifth terminal 465. As another example, the switch 460 may connect the second RF chain 420 and the first reception chain 430 to the second antenna 473 in such a manner that the second terminal 462 is connected to the fourth terminal 464 and that the second terminal 462 is connected to the sixth terminal 466.

When the switch 460 is implemented as a multi-on switch, the signal received by the first antenna 471 may be transmitted to the first duplexer 451 through the first terminal 461 and the third terminal 463. The first duplexer 451 may separate (or filter) the reception signal in the first frequency band from among the signals received by the first antenna 471, and the separated signal may be transmitted to the first LNA 412. The first LNA 412 may amplify the received signal and transmit the amplified signal to a transceiver (e.g., the transceiver 303 in FIG. 3A). The signal received by the first antenna 471 may be transmitted to the first reception filter 457 through the first terminal 461 and the fifth terminal 465. The first reception filter 457 may separate (or filter) the reception signal in the second frequency band from among the signals received by the first antenna 471, and the separated signal may be transmitted to the fourth LNA 441. The fourth LNA 441 may amplify the received signal and transmit the amplified signal to the transceiver 303.

When the switch 460 is implemented as a multi-on switch, the signal received by the second antenna 473 may be transmitted to the second duplexer 453 through the second terminal 462 and the fourth terminal 464. The second duplexer 453 may separate (or filter) the reception signal in the second frequency band from among the signals received by the second antenna 473, and the separated signal may be transmitted to the second LNA 422. The second LNA 422 may amplify the received signal and transmit the amplified signal to the transceiver 303. The signal received by the second antenna 473 may be transmitted to the second reception filter 459 through the second terminal 462 and the sixth terminal 466. The second reception filter 459 may separate the reception signal in the first frequency band from among the signals received by the second antenna 473, and the separated signal may be transmitted to the third LNA 431. The third LNA 431 may amplify the received signal and transmit the amplified signal to the transceiver 303.

The first amplifier 411 may amplify the transmission signal in the first frequency band transmitted from the transceiver 303. The amplified transmission signal may be transmitted to the outside of the electronic device through the first duplexer 451, the third terminal 463, the first terminal 461, and/or the first antenna 471.

The second amplifier 421 may amplify the transmission signal in the second frequency band transmitted by the transceiver 303. The amplified transmission signal may be transmitted to the outside of the electronic device through the second duplexer 453, the fourth terminal 464, the second terminal 462, and/or the second antenna 473.

The FEM 400 may output the transmission signal in the first frequency band through the first antenna 471, and output the transmission signal in the second frequency band through the second antenna 473. The FEM 400 may receive the reception signal in the first frequency band and the reception signal in the second frequency band through the first antenna 471 and/or the second antenna 473. According to the manner described above, the FEM 400 may support dual connectivity (e.g., E-UTRA-NR-Dual connectivity (EN-DC)) simultaneously using different cellular communication schemes and/or carrier aggregation that is a data communication scheme using a plurality of frequency bands. The first frequency band may include a legacy band, and the second frequency band may include a 5G band. For example, the FEM 400 may support EN-DC.

Figure 5:
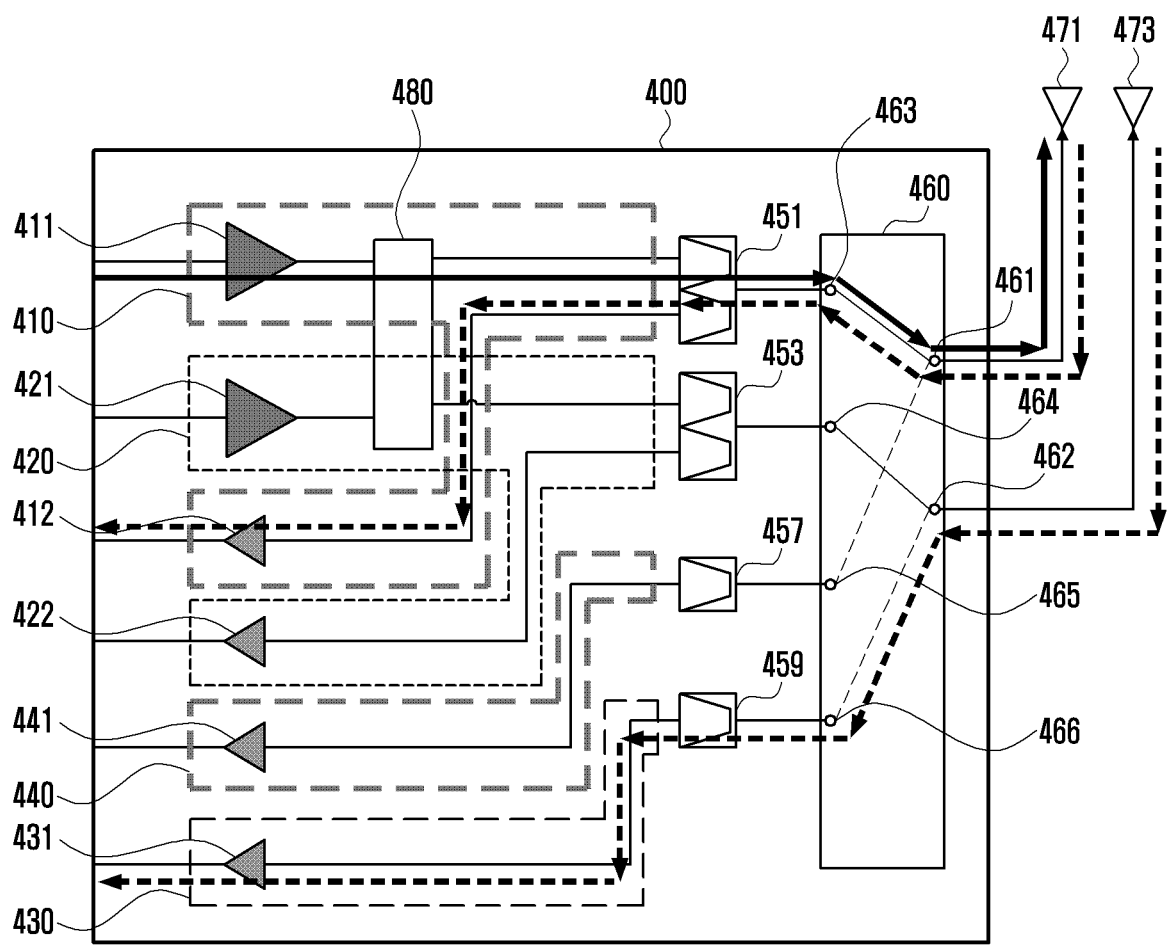
FIG. 5 illustrates paths of a transmission signal and a reception signal in a first frequency band in communication circuitry according to an embodiment.

FIG. 5 illustrates paths of a transmission signal and a reception signal in a first frequency band in communication circuitry according to an embodiment.

Referring to FIG. 5, an FEM may support both the communication in a first frequency band and the communication in a second frequency band. The FEM 400 may simultaneously transmit a transmission signal in a first frequency band and a transmission signal in a second frequency band through a first antenna 471 and a second antenna 473. The FEM 400 may receive a reception signal in a first frequency band and a reception signal in a second frequency band through the first antenna 471 and/or the second antenna 473.

The first antenna 471 and/or the second antenna 473 may receive the reception signal in the first frequency band. The signal received by the first antenna 471 may be transmitted to the first duplexer 451 through the first terminal 461 and the third terminal 463. The first duplexer 451 may separate (or filter) the reception signal in the first frequency band from among the signals received by the first antenna 471, and transmit the separated signal to the first LNA 412. The first LNA 412 may amplify the received signal and transmit the amplified signal to the transceiver 303.

The signal received by the second antenna 473 may be transmitted to the second reception filter 459 through the second terminal 462 and the sixth terminal 466. The second reception filter 459 may separate the reception signal in the first frequency band from among the signals received by the second antenna 473, and transmit the separated signal to the third LNA 431. The third LNA 431 may amplify the received signal and transmit the amplified signal to the transceiver 303.

The first amplifier 411 may amplify the transmission signal in the first frequency band transmitted by the transceiver 303. The amplified transmission signal may be transmitted to the outside of the electronic device through the first duplexer 451, the third terminal 463, the first terminal 461, and/or the first antenna 471.

Figure 6:
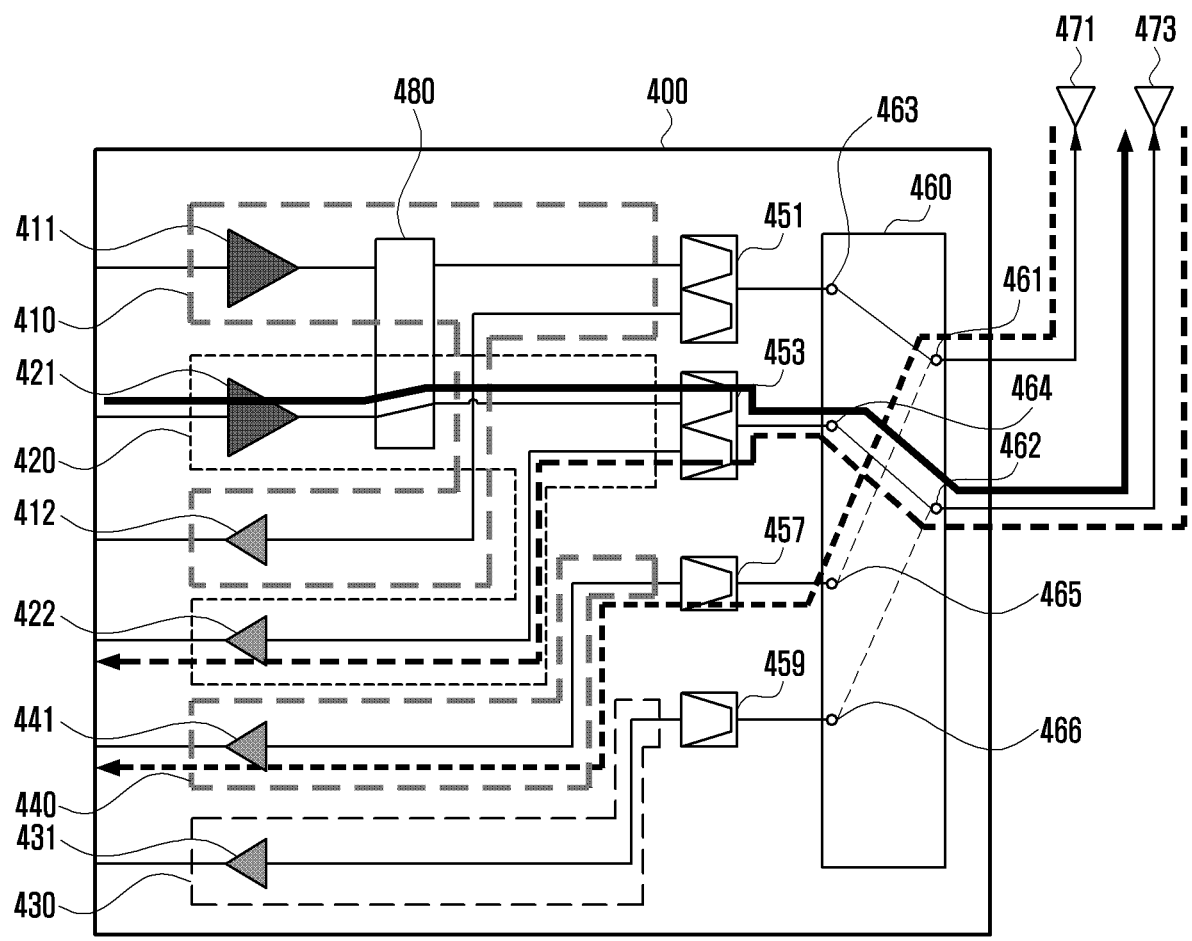
FIG. 6 illustrates paths of a transmission signal and a reception signal in a second frequency band in communication circuitry according to an embodiment.

FIG. 6 illustrates paths of a transmission signal and a reception signal in a second frequency band in communication circuitry according to an embodiment.

Referring to FIG. 6, a FEM (e.g., the FEM 400 in FIG. 4) may support both the communication in a first frequency band and the communication in a second frequency band. The FEM 400 may simultaneously output the transmission signal in the first frequency band and the transmission signal in the second frequency band through the first antenna 471 and the second antenna 473. The FEM 400 may receive the reception signal in the first frequency band and the reception signal in the second frequency band through the first antenna 471 and/or the second antenna 473.

The first antenna 471 and/or the second antenna 473 may receive the reception signal in the second frequency band.

The signal received by the second antenna 473 may be transmitted to the second duplexer 453 through the second terminal 462 and the fourth terminal 464. The second duplexer 453 may separate (or filter) the reception signal in the second frequency band from among the signals received by the second antenna 473, and transmit the separated signal to the second LNA 422. The second LNA 422 may amplify the received signal and transmit the amplified signal to the transceiver 303.

The signal received by the first antenna 471 may be transmitted to the first reception filter 457 through the first terminal 461 and the fifth terminal 465. The first reception filter 457 may separate (or filter) the reception signal in the second frequency band from among the signals received by the first antenna 471, and transmit the separated signal to the fourth LNA 441. The fourth LNA 441 may amplify the received signal and transmit the amplified signal to the transceiver 303.

The second amplifier 421 may amplify the transmission signal in the second frequency band transmitted by the transceiver 303. The amplified transmission signal may be transmitted to the outside of the electronic device through the second duplexer 453, the fourth terminal 464, the second terminal 462, and/or the second antenna 473.

Figure 7:
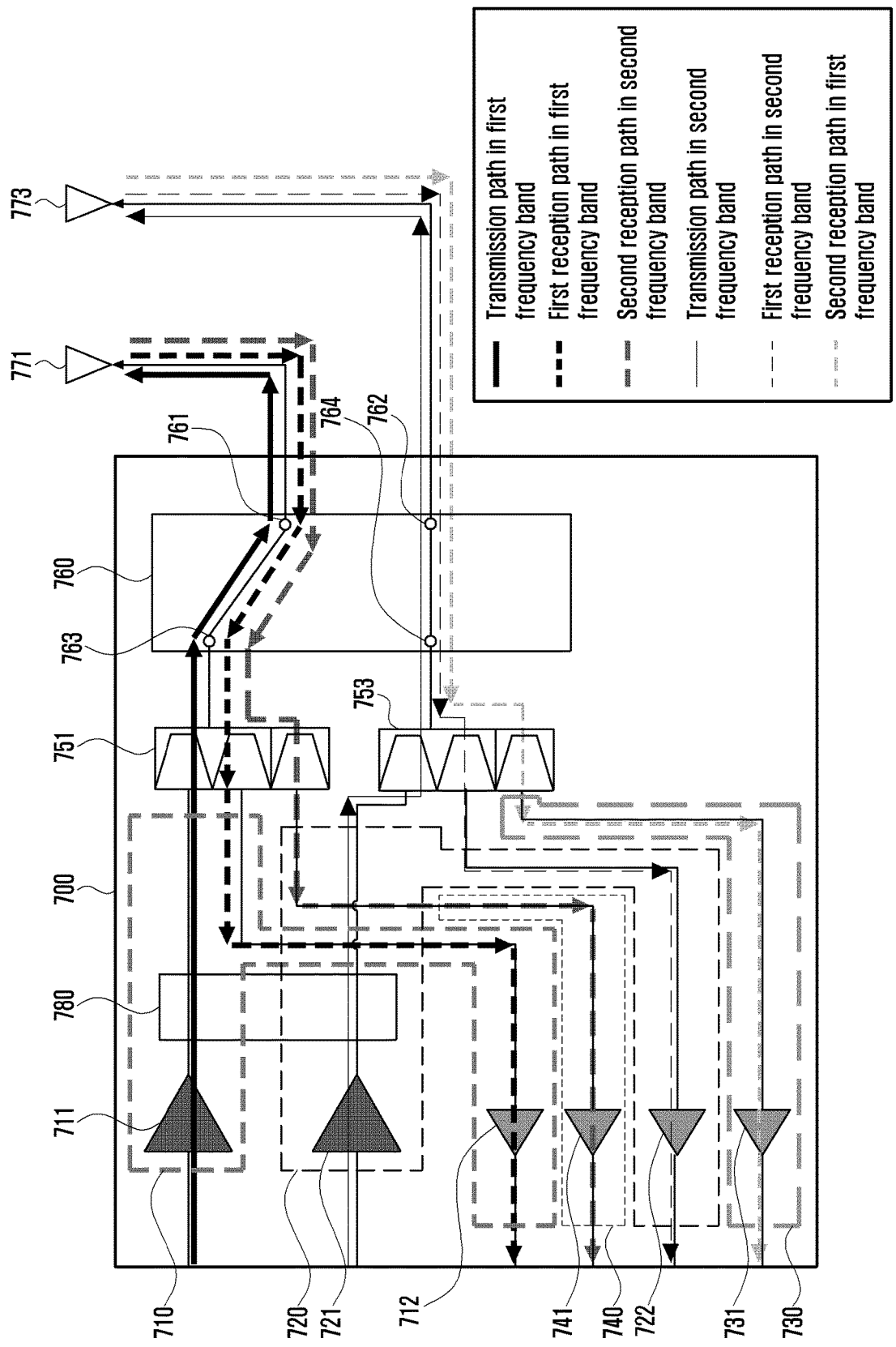
FIG. 7 illustrates communication circuitry according to an embodiment.

FIG. 7 illustrates communication circuitry according to an embodiment.

Referring to FIG. 7, an FEM 700 implemented in the communication circuitry includes a first RF chain 710 for outputting a transmission signal in a first frequency band or receiving a reception signal in a first frequency band, a second RF chain 720 for outputting a transmission signal in a second frequency band or receiving a reception signal in a second frequency band, a first reception chain 730 for receiving the reception signal in the first frequency band, and a second reception chain 740 for receiving the reception signal in the second frequency band.

The first RF chain 710 includes a first amplifier 711 and a first LNA 712 for outputting the transmission signal in the first frequency band through the first antenna 771 or receiving the reception signal in the first frequency band through the first antenna 771.

The second RF chain 720 includes a second amplifier 721 and a second LNA 722 for outputting the transmission signal in the second frequency band through the second antenna 773 or receiving the reception signal in the second frequency band through the second antenna 773.

The first reception chain 730 includes a third LNA 731 to support diversity reception of the reception signal in the first frequency band through the second antenna 773. The second reception chain 740 includes a fourth LNA 741 to support diversity reception of the reception signal in the second frequency band through the first antenna 771.

The FEM 700 includes a switch 760 that performs connection or disconnection between the components included in the FEM 700 and the first antenna 771 and/or the second antenna 773. The switch 760 includes a first terminal 761 connected to the first antenna 771, a second terminal 762 connected to the second antenna 773, a third terminal 763 connected to the first RF chain 710 and the second reception chain 740 through a first multiplexer 751, and a fourth terminal 764 connected to the second RF chain 720 and the first reception chain 730 through a second multiplexer 753. The number of terminals of the switch 760 may vary depending on the number of frequency bands supported by the FEM 700.

The FEM 700 includes a first multiplexer 751 for separating the transmission signal in the first frequency band transmitted through the first antenna 771, the reception signal in the first frequency band received through the first antenna 771, and the reception signal in the second frequency band received through the first antenna 771. The first multiplexer 751 may be connected between the first RF chain 710 and the second reception chain 740 and the third terminal 763 of the switch 760.

The FEM 700 includes a second multiplexer 753 for separating the transmission signal in the second frequency band transmitted through the second antenna 773, the reception signal in the first frequency band received through the second antenna 773, and the reception signal in the second frequency band received through the second antenna 773. The second multiplexer 753 may be connected between the second RF chain 720 and the first reception chain 730 and the fourth terminal 764 of the switch 760.

The FEM 700 further includes a band selection switch 780 for controlling the connection between the first amplifier 711 and the first multiplexer 751 and the connection between the second amplifier 721 and the second multiplexer 753 depending on the used frequency band. The band selection switch 780 may be omitted according to a designer's intention.

The switch 760 may connect the first RF chain 710 and the second reception chain 740 to the first antenna 771 in such a manner that the first terminal 761 is connected to the third terminal 763. As another example, the switch 760 may connect the second RF chain 720 and the first reception chain 730 to the second antenna 773 in such a manner that the second terminal 762 is connected to the fourth terminal 764.

The FEM 700 is able to support dual connectivity by including the first multiplexer 751 and/or the second multiplexer 753 even if the switch 760 is not implemented as a multi-on switch.

The signal received by the first antenna 771 may be transmitted to the first multiplexer 751 through the first terminal 761 and the third terminal 763. The first multiplexer 751 may separate the reception signal in the first frequency band and the reception signal in the second frequency band from among the signals received by the first antenna 771. The first multiplexer 751 may transmit the reception signal in the first frequency band to the first LNA 712. The first LNA 712 may amplify the received signal and transmit the amplified signal to a transceiver. The first multiplexer 751 may transmit the reception signal in the second frequency band to the fourth LNA 741. The fourth LNA 741 may amplify the received signal and transmit the amplified signal to the transceiver. As described above, the FEM 700 may process the reception signal in the first frequency band and the reception signal in the second frequency band received by the first antenna 771.

The signal received by the second antenna 773 may be transmitted to the second multiplexer 752 through the second terminal 762 and the fourth terminal 764. The second multiplexer 753 may separate the reception signal in the first frequency band and the reception signal in the second frequency band from among the signals received by the second antenna 773. The second multiplexer 753 may transmit the reception signal in the second frequency band to the second LNA 722. The second LNA 722 may amplify the received signal and transmit the amplified signal to the transceiver 303. The second multiplexer 753 may transmit the second reception signal in the first frequency band to the third LNA 731. The third LNA 731 may amplify the received signal in the first frequency band and transmit the amplified signal to the transceiver 303. As described above, the FEM 700 may process the reception signal in the first frequency band and the reception signal in the second frequency band received by the second antenna 773.

The first amplifier 711 may amplify the transmission signal in the first frequency band transmitted by the transceiver 303. The amplified transmission signal may be output to the outside of the electronic device through the first multiplexer 751, the third terminal 763, the first terminal 761, and/or the first antenna 771.

The second amplifier 721 may amplify the transmission signal in the second frequency band transmitted by the transceiver 303. The amplified transmission signal may be output to the outside of the electronic device through the second multiplexer 753, the fourth terminal 764, the second terminal 762, and/or the second antenna 773.

The FEM 700 may output the transmission signal in the first frequency band through the first antenna 771, and output the transmission signal in the second frequency band through the second antenna 773. The FEM 700 may receive the reception signal in the first frequency band and/or the reception signal in the second frequency band through the first antenna 771 and the second antenna 773. Accordingly, the FEM 700 may support dual connectivity (e.g., EN-DC) simultaneously using different cellular communication schemes and/or carrier aggregation that is a data communication scheme using a plurality of frequency bands.

Figure 8:
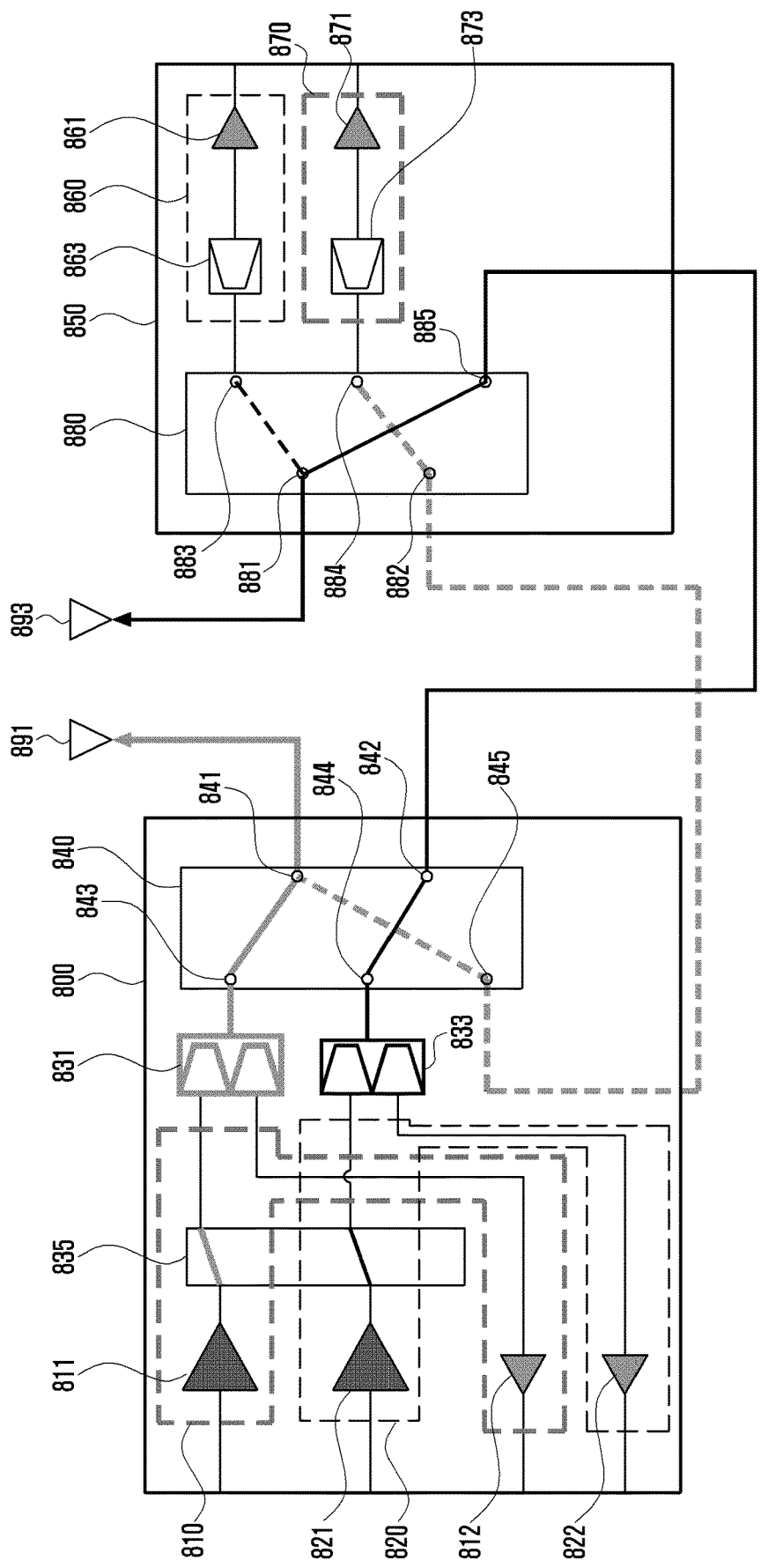
FIG. 8 illustrates communication circuitry according to an embodiment.

FIG. 8 illustrates communication circuitry according to an embodiment.

Referring to FIG. 8, the communication circuitry includes two FEMs (i.e., a first FEM 800 and a second FEM 850), instead of one FEM.

The first FEM 800 includes a first RF chain 810 for outputting a transmission signal in a first frequency band or receiving a reception signal in a first frequency band, and a second RF chain 820 for outputting a transmission signal in a second frequency band or receiving a reception signal in a second frequency band.

The first RF chain 810 includes a first amplifier 811 and a first LNA 812 for outputting the transmission signal in the first frequency band through the first antenna 891 or receiving the reception signal in the first frequency band through the first antenna 891.

The second RF chain 820 includes a second amplifier 821 and a second LNA 822 for outputting the transmission signal in the second frequency band through the second antenna 893 or receiving the reception signal in the second frequency band through the second antenna 893.

The second FEM 850 includes a first reception chain 860 for receiving the reception signal in the first frequency band and/or a second reception chain 870 for receiving the reception signal in the second frequency band. The first reception chain 860 includes a third LNA 861 and a first reception filter 863 through which the signal in the first frequency band passes to support diversity reception of the reception signal in the first frequency band through the second antenna 893. The second reception chain 870 includes a fourth LNA 871 and a second reception filter 873 through which the reception signal in the second frequency band passes to support diversity reception of the reception signal in the second frequency band through the first antenna 891.

The first FEM 800 includes a first duplexer 831 for separating the transmission signal in the first frequency band transmitted through the first antenna 891 and the reception signal in the first frequency band received through the first antenna 891. The first duplexer 831 may be connected between the first RF chain 810 and the first switch 840.

The first FEM 800 includes a second duplexer 893 for separating the transmission signal in the second frequency band transmitted through the second antenna 893 and the reception signal in the second frequency band received through the second antenna 893. The second duplexer 893 may be connected between the second RF chain 820 and the first switch 840.

The first FEM 800 may not be physically connected to the second antenna 893. For example, the first FEM 800 may be electrically connected to the second antenna 893 through the second FEM 850. The second FEM 850 may not be physically connected to the first antenna 891. For example, the second FEM 850 may be electrically connected to the first antenna 891 through the first antenna 891 and the first FEM 800.

The first FEM 800 includes a first switch 840 that performs connection or disconnection between the components included in the first FEM 800 and the first antenna 891 and/or the second antenna 893. The first switch 840 includes a first terminal 841 connected to the first antenna 891, a second terminal 842 connected to the second FEM 850, a third terminal 843 connected to the first RF chain 810, a fourth terminal 844 connected to the second RF chain 820, and a fifth terminal 845 connected to the second FEM 850.

The second FEM 850 includes a second switch 880 that performs connection or disconnection between the components included in the second FEM 850 and the first antenna 891 and/or the second antenna 893. The second switch 880 includes a sixth terminal 881 connected to the second antenna 893, a seventh terminal 882 connected to the first FEM 800, an eighth terminal 883 connected to the first reception chain 860, a ninth terminal 884 connected to the second reception chain 870, and a tenth terminal 885 connected to the first FEM 800.

The second terminal 842 and the tenth terminal 885 may be electrically connected. For example, according to the operations of the first switch 840 and the second switch 880, the second RF chain 820 may be electrically connected to the second antenna 893. As another example, the fifth terminal 845 and the seventh terminal 882 may be electrically connected. For example, according to operations of the first switch 840 and the second switch 880, the second reception chain 870 may be electrically connected to the first antenna 891.

The first switch 840 and/or the second switch 880 may be implemented as multi-on switches in which one terminal may be connected to two or more other terminals. For example, the first switch 840 may connect the first RF chain 810 and the second reception chain 870 to the first antenna 891 in such a manner that the first terminal 841 is connected to the third terminal 843 and that the first terminal 841 is connected to the fifth terminal 845. As another example, the second switch 880 may connect the second RF chain 820 and the first reception chain 860 to the second antenna 893 in such a manner that the sixth terminal 881 is connected to the eighth terminal 883 and that the six terminal 881 is connected to the tenth terminal 885.

When the first switch 840 and/or the second switch 880 are implemented as multi-on switches, the signal received by the first antenna 891 may be transmitted to the first duplexer 831 through the first terminal 841 and the third terminal 843. The first duplexer 831 may separate (or filter) the reception signal in the first frequency band from among the signals received by the first antenna 891, and transmit the separated signal to the first LNA 812. The first LNA 812 may amplify the received signal and transmit the amplified signal to the transceiver. The signal received by the first antenna 891 may be transmitted to the second reception chain 870 through the first terminal 841, the fifth terminal 845, the seventh terminal 882, and the ninth terminal 884. The second reception filter 873 of the second reception chain 870 may separate (or filter) the reception signal in the second frequency band from among the signals received by the first antenna 891, and transmit the separated signal to a fourth LNA 871. The fourth LNA 871 may amplify the received signal and transmit the amplified signal to the transceiver 303.

When the first switch 840 and/or the second switch 880 are implemented as multi-on switches, the signal received by the second antenna 893 may be transmitted to the second duplexer 833 through the sixth terminal 881, the tenth terminal 885, the second terminal 842, and the fourth terminal 884. The second duplexer 833 may separate (or filter) the reception signal in the second frequency band from among the signals received by the second antenna 893, and transmit the separated signal to a second LNA 822. The second LNA 822 may amplify the received signal and transmit the amplified signal to the transceiver 303. The signal received by the second antenna 893 may be transmitted to the first reception chain 860 through the sixth terminal 881 and the eighth terminal 883. The first reception filter 863 of the first reception chain 860 may separate (or filter) the reception signal in the first frequency band from among the signals received by the second antenna 893, and transmit the separated signal to a third LNA 861. The third LNA 861 may amplify the received signal and transmit the amplified signal to the transceiver 303.

The first amplifier 811 may amplify the transmission signal in the first frequency band transmitted by the transceiver 303. The amplified transmission signal may be output to the outside of the electronic device through the first duplexer 831, the third terminal 843, the first terminal 841, and/or the first antenna 891.

The second amplifier 821 may amplify the transmission signal in the second frequency band transmitted by the transceiver 303. The amplified transmission signal may be output to the outside of the electronic device 101 through the second duplexer 833, the fourth terminal 844, the second terminal 842, the tenth terminal 885, the sixth terminal 881, and/or the second antenna 893.

The first FEM 800 further includes a band selection switch 835 for controlling the connection between the first amplifier 811 and the first duplexer 831 and the connection between the second amplifier 821 and the second duplexer 833 depending on the used frequency band. The band selection switch 835 may be omitted according to a designer's intention.

The communication circuitry 350 including the first FEM 800 and the second FEM 850 may output the transmission signal in the first frequency band through the first antenna 891, and output the transmission signal in the second frequency band through the second antenna 893. The communication circuitry 350 may receive the reception signal in the first frequency band and/or the reception signal in the second frequency band through the first antenna 891 and/or the second antenna 893. Accordingly, the communication circuitry 350 may support dual connectivity (e.g., EN-DC) simultaneously using different cellular communication schemes and/or carrier aggregation that is a data communication scheme using a plurality of frequency bands.

According to an embodiment, communication circuitry may include a first RF chain configured to output a transmission signal in a first frequency band through a first antenna or receive a reception signal in the first frequency band through the first antenna, a second RF chain configured to output a transmission signal in a second frequency band through a second antenna or receive a reception signal in the second frequency band through the second antenna, a first reception chain configured to receive a signal in the first frequency band, which is received through the second antenna, a second reception chain configured to receive a signal in the second frequency band, which is received through the first antenna, and a switch, wherein the switch may be configured to connect the first RF chain and the second reception chain to the first antenna and connect the second RF chain and the first reception chain to the second antenna.

The switch may include a first terminal connected to the first antenna, a second terminal connected to the second antenna, a third terminal connected to the first RF chain, a fourth terminal connected to the second RF chain, a fifth terminal connected to the second reception chain, and a sixth terminal connected to the first reception chain, and the switch may be configured to connect the third terminal and the sixth terminal to the first terminal and connect the fourth terminal and the fifth terminal to the second terminal.

The switch may be implemented as a multi-on switch in which the first terminal and/or the second terminal can be connected to at least two or more terminals.

The first RF chain 410 may include a first duplexer configured to separate the transmission signal in the first frequency band and the reception signal in the first frequency band, and the first duplexer may be connected to the third terminal.

The second RF chain may include a second duplexer configured to separate the transmission signal in the second frequency band and the reception signal in the second frequency band, and the second duplexer may be connected to the fourth terminal.

The first antenna and the second antenna may be configured to simultaneously receive the signal in the first frequency band and the signal in the second frequency band.

The switch may include a first terminal connected to the first antenna, a second terminal connected to the second antenna, a third terminal connected to the first RF chain and the second reception chain, and a fourth terminal connected to the second RF chain and the first reception chain.

The communication circuitry may include a first multiplexer configured to separate the transmission signal in the first frequency band, the reception signal in the first frequency band, and the reception signal in the second frequency band, and a second multiplexer configured to separate the transmission signal in the second frequency band, the reception signal in the first frequency band, and the reception signal in the second frequency band, wherein the first RF chain and the second reception chain may be connected to the third terminal through the first multiplexer, and wherein the second RF chain and the first reception chain may be connected to the fourth terminal through the second multiplexer.

The switch may be configured to connect the first terminal to the third terminal and to connect the second terminal to the fourth terminal.

According to an embodiment, communication circuitry may include a first FEM including a first switch connected to a first antenna, and a second FEM including a second switch connected to a second antenna, wherein the first FEM may include a first RF chain configured to output a transmission signal in a first frequency band through the first antenna or receive a reception signal in the first frequency band through the first antenna, and a second RF chain configured to output a transmission signal in a second frequency band through the second antenna or receive a reception signal in the second frequency band through the second antenna, wherein the second FEM may include a first reception chain configured to receive a signal in the first frequency band, which is received through the second antenna, and a second reception chain configured to receive a signal in the second frequency band, which is received through the first antenna, wherein the first switch may be configured to connect the second RF chain and the second FEM, and wherein the second switch may be configured to connect the second reception chain and the first FEM.

The first switch may be configured to connect the first antenna with the first RF chain and the second reception chain.

The second switch may be configured to connect the second antenna with the second RF chain and the first reception chain.

The first switch may include a first terminal connected to the first antenna, a second terminal connected to the second antenna through the second switch, a third terminal connected to the first RF chain, a fourth terminal connected to the second RF chain, and a fifth terminal connected to the second reception chain through the second switch.

The second switch may include a sixth terminal connected to the second antenna, a seventh terminal connected to the first antenna through the first switch, an eighth terminal connected to the first reception chain, a ninth terminal connected to the second reception chain, and a tenth terminal connected to the second RF chain through the first switch.

The first antenna and the second antenna may be configured to simultaneously receive the signal in the first frequency band and the signal in the second frequency band.

The first FEM may include a first duplexer configured to separate the transmission signal in the first frequency band and the reception signal in the first frequency band, and a second duplexer configured to separate the transmission signal in the second frequency band and the reception signal in the second frequency band, wherein the first RF chain may be connected to the third terminal through the first duplexer, and wherein the second RF chain may be connected to the fourth terminal through the second duplexer.

According to an embodiment, an electronic device may include a CP and communication circuitry connected to the CP, wherein the communication circuitry may include a first RF chain configured to output a transmission signal in a first frequency band through a first antenna or receive a reception signal in the first frequency band through the first antenna, a second RF chain configured to output a transmission signal in a second frequency band through a second antenna or receive a reception signal in the second frequency band through the second antenna, a first reception chain configured to receive a signal in the first frequency band, which is received through the second antenna, a second reception chain configured to receive a signal in the second frequency band, which is received through the first antenna, and a switch, and wherein the CP may be configured to control the switch to connect the first RF chain and the second reception chain to the first antenna and control the switch to connect the second RF chain and the first reception chain to the second antenna.

The switch may include a first terminal connected to the first antenna, a second terminal connected to the second antenna, a third terminal connected to the first RF chain, a fourth terminal connected to the second RF chain, a fifth terminal connected to the second reception chain, and a sixth terminal connected to the first reception chain, and the switch may be configured to connect the third terminal and the sixth terminal to the first terminal and connect the fourth terminal and the fifth terminal to the second terminal.

The switch may include a first terminal connected to the first antenna, a second terminal connected to the second antenna, a third terminal connected to the first RF chain and the second reception chain, and a fourth terminal connected to the second RF chain and the first reception chain.

The communication circuitry may include a first filter configured to separate the transmission signal in the first frequency band, the reception signal in the first frequency band, and the reception signal in the second frequency band, and a second filter configured to separate the transmission signal in the second frequency band, the reception signal in the first frequency band, and the reception signal in the second frequency band, wherein the first RF chain and the second reception chain may be connected to the third terminal through the first filter, and wherein the second RF chain and the first reception chain may be connected to the fourth terminal through the second filter.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. Communication circuitry, comprising:
   a first radio frequency (RF) chain configured to output a first transmission signal in a first frequency band through a first antenna or receive a first reception signal in the first frequency band through the first antenna;
   a second RF chain configured to output a second transmission signal in a second frequency band through a second antenna or receive a second reception signal in the second frequency band through the second antenna;
a first reception chain configured to receive a first signal in the first frequency band, which is received through the second antenna;
a second reception chain configured to receive a second signal in the second frequency band, which is received through the first antenna;
a first multiplexer configured to separate the first transmission signal in the first frequency band, the first reception signal in the first frequency band, and the second reception signal in the second frequency band;
a second multiplexer configured to separate the second transmission signal in the second frequency band, the first reception signal in the first frequency band, and the second reception signal in the second frequency band; and
a switch configured to connect the first RF chain and the second reception chain to the first antenna and connect the second RF chain and the first reception chain to the second antenna,
wherein the switch comprises:
a first terminal connected to the first antenna;
a second terminal connected to the second antenna;
a third terminal connected to the first RF chain and the second reception chain; and
a fourth terminal connected to the second RF chain and the first reception chain,
wherein the first RF chain and the second reception chain are connected to the third terminal through the first multiplexer, and
wherein the second RF chain and the first reception chain are connected to the fourth terminal through the second multiplexer.

2. The communication circuitry of claim 1, wherein the switch further comprises:
a fifth terminal connected to the second reception chain; and
a sixth terminal connected to the first reception chain, and
wherein the switch is further configured to connect the third terminal and the sixth terminal to the first terminal and connect the fourth terminal and the fifth terminal to the second terminal.

3. The communication circuitry of claim 2, wherein the switch is implemented as a multi-on switch in which at least one of the first terminal or the second terminal is connected to two or more terminals.

4. The communication circuitry of claim 1, wherein the first RF chain comprises a first duplexer configured to separate the first transmission signal in the first frequency band and the first reception signal in the first frequency band, and
wherein the first duplexer is connected to the third terminal.

5. The communication circuitry of claim 1, wherein the second RF chain comprises a second duplexer configured to separate the second transmission signal in the second frequency band and the second reception signal in the second frequency band, and
wherein the second duplexer is connected to the fourth terminal.

6. The communication circuitry of claim 1, wherein the first antenna and the second antenna are configured to simultaneously receive the first reception signal in the first frequency band and the second reception signal in the second frequency band, respectively.

7. The communication circuitry of claim 1, wherein the switch is further configured to connect the first terminal to the third terminal and to connect the second terminal to the fourth terminal.

8. Communication circuitry, comprising:
a first front end module (FEM); and
a second FEM,
wherein the first FEM comprises:
a first switch connected to a first antenna;
a first radio frequency (RF) chain configured to output a first transmission signal in a first frequency band through the first antenna or receive a first reception signal in the first frequency band through the first antenna; and
a second RF chain configured to output a second transmission signal in a second frequency band through the second antenna or receive a second reception signal in the second frequency band through the second antenna,
wherein the second FEM comprises:
a second switch connected to a second antenna;
a first reception chain configured to receive a first signal in the first frequency band, which is received through the second antenna; and
a second reception chain configured to receive a second signal in the second frequency band, which is received through the first antenna,
wherein the first switch is configured to connect the second RF chain and the second FEM, and
wherein the second switch is configured to connect the second reception chain and the first FEM.

9. The communication circuitry of claim 8, wherein the first switch is further configured to connect the first antenna with the first RF chain and the second reception chain.

10. The communication circuitry of claim 8, wherein the second switch is further configured to connect the second antenna with the second RF chain and the first reception chain.

11. The communication circuitry of claim 8, wherein the first switch comprises:
a first terminal connected to the first antenna;
a second terminal connected to the second antenna through the second switch;
a third terminal connected to the first RF chain;
a fourth terminal connected to the second RF chain; and
a fifth terminal connected to the second reception chain through the second switch.

12. The communication circuitry of claim 8, wherein the second switch comprises:
a sixth terminal connected to the second antenna;
a seventh terminal connected to the first antenna through the first switch;
an eighth terminal connected to the first reception chain;
a ninth terminal connected to the second reception chain; and
a tenth terminal connected to the second RF chain through the first switch.

13. The communication circuitry of claim 8, wherein the first antenna and the second antenna are configured to simultaneously receive the first reception signal in the first frequency band and the second reception signal in the second frequency band, respectively.

14. The communication circuitry of claim 8, wherein the first FEM comprises:
a first duplexer configured to separate the first transmission signal in the first frequency band and the first reception signal in the first frequency band; and a second duplexer configured to separate the second transmission signal in the second frequency band and the second reception signal in the second frequency band, wherein the first RF chain is connected to a third terminal through the first duplexer, and wherein the second RF chain is connected to a fourth terminal through the second duplexer.

15. An electronic device, comprising:

a communication processor (CP); and communication circuitry connected to the CP, wherein the communication circuitry comprises:
- a first radio frequency (RF) chain configured to output a first transmission signal in a first frequency band through a first antenna or receive a first reception signal in the first frequency band through the first antenna;
- a second RF chain configured to output a second transmission signal in a second frequency band through a second antenna or receive a second reception signal in the second frequency band through the second antenna;
- a first reception chain configured to receive a first signal in the first frequency band, which is received through the second antenna;
- a second reception chain configured to receive a second signal in the second frequency band, which is received through the first antenna;
- a first filter configured to separate the first transmission signal in the first frequency band, the first reception signal in the first frequency band, and the second reception signal in the second frequency band;
- a second filter configured to separate the second transmission signal in the second frequency band, the first reception signal in the first frequency band, and the second reception signal in the second frequency band; and
- a switch, wherein the CP is configured to control the switch to connect the first RF chain and the second reception chain to the first antenna and control the switch to connect the second RF chain and the first reception chain to the second antenna, wherein the switch comprises:
- a first terminal connected to the first antenna;
- a second terminal connected to the second antenna;
- a third terminal connected to the first RF chain and the second reception chain; and
- a fourth terminal connected to the second RF chain and the first reception chain, wherein the first RF chain and the second reception chain are connected to the third terminal through the first filter, and wherein the second RF chain and the first reception chain are connected to the fourth terminal through the second filter.

16. The electronic device of claim 15, wherein the switch further comprises:
- a fifth terminal connected to the second reception chain; and
- a sixth terminal connected to the first reception chain, and wherein the switch is configured to connect the third terminal and the sixth terminal to the first terminal and connect the fourth terminal and the fifth terminal to the second terminal.

* * * * *